United States Patent
Sakurai et al.

[11] Patent Number: 5,991,251
[45] Date of Patent: Nov. 23, 1999

[54] METHOD AND APPARATUS FOR CHANGING LASER BEAM POWER OF AN OPTICAL STORAGE DEVICE FOR VARIOUS TYPES OF COMPACT DISKS

[75] Inventors: Tatsuaki Sakurai; Ryuji Kudo, both of Kanagawa-ken; Masaaki Sofue, Machida, all of Japan

[73] Assignee: Ricoh Company, Ltd., Tokyo, Japan

[21] Appl. No.: 08/937,587

[22] Filed: Sep. 29, 1997

[30] Foreign Application Priority Data

Mar. 11, 1997 [JP] Japan ..................................... 9-055918

[51] Int. Cl.$^6$ ....................................................... G11B 7/00
[52] U.S. Cl. .................. 369/54; 369/58; 369/116
[58] Field of Search .................... 369/54, 53, 58, 369/47, 48, 49, 50, 59, 60, 116, 112, 13

[56] References Cited

U.S. PATENT DOCUMENTS

| | | | |
|---|---|---|---|
| 5,544,137 | 8/1996 | Ohara et al. | 369/54 |
| 5,706,271 | 1/1998 | Hashimote | 369/54 X |
| 5,724,328 | 3/1998 | Yanagi | 369/54 X |

*Primary Examiner*—Muhammad Edun
*Attorney, Agent, or Firm*—Dickstein Shapiro Morin & Oshinsky, LLP

[57] ABSTRACT

A layer beam controller for an optical storage apparatus includes a laser beam generator, a laser beam power varier for varying the laser beam power to first, second, and third power levels, a memory for storing predetermined reference values including first reference values corresponding to the first power level and second reference values corresponding to the second power level, a light amount detector for detecting a light amount of the laser beam, a laser beam power corrector for correcting the laser beam power at the respective power level by comparing the light amount and a corresponding one of the predetermined reference values selected by a type of the compact disk in operation in the optical storage apparatus. The laser beam controller further includes a power level assigner for assigning the first, second and third power levels based on the type of disk.

34 Claims, 6 Drawing Sheets

METHOD AND APPARATUS FOR CHANGING LASER BEAM POWER OF AN OPTICAL STORAGE DEVICE FOR VARIOUS TYPES OF COMPACT DISKS

BACKGROUND OF THE INVENTION

1. Field of the Invention

The present invention relates to a method and apparatus for controlling the laser of an optical storage apparatus, and more particularly to a method and apparatus for changing a power level of a laser beam in an optical storage apparatus for various types of optical media including a CD-ROM (compact disk read only memory), a CD-R (compact disk recordable), a CD-RW (compact disk re-writable), and so forth.

2. Description of the Background

Reading and writing techniques for a so-called compact disk (CD) used as an optical mass-storage medium for a computer and the like have been greatly improved in recent years. The a result, three types of the compact disks (CDs), the CD-ROM (compact disk read only memory), the CD-R (compact disk recordable), and the CD-RW (compact disk rewritable), have been developed so far. The CD-ROM is a read only memory type compact disk. The CD-R is a one-time data recordable type compact disk that allows a one-time data writing operation by a user and multiple data reading operations. The CD-RW is a re-writable type compact disk that allows multiple data writing, data reading, and data erasing operations.

A light source is required for the above-mentioned operations. Such as a laser diode, for example, which is relatively compact in size and produces an intense laser beam. The last developed CD-RW uses also the diode laser. However, a technique required to control the power of the laser beam for the CD-RW in different from one for the CD-R. As a result, two different laser beam power controllers may coexist; a first controller for the CD-R that is capable of performing one-time data writing and data reading operations and a second controller for the CD-RW that is capable of performing multiple data writing, reading, and erasing operations.

The CD-R allows one-time data writing and reading operations as mentioned above, but it does not allow a data erasing operation. The data writing and reading operations to the CD-R are performed using the above-mentioned first controller that generates a laser beam that is set at different powers for writing or reading the CD-R. The reading power is generated and supplied continuously when the data of the CD-R is read. However, for the one-time writing operation, the first controller is arranged to supply a laser beam that has a two-level power. Specifically, the power is set at a slightly greater level than the writing power in an initial period and the writing power, which is an appropriate level for writing data, in a successive period. Therefore, the laser beam power for the CD-R must be capable of being changed to three levels, the reading power, the writing power, and the initial power for the writing in the order of increasing power.

The operations of writing, reading, and erasing data of the CD-RW are carried out using the above-mentioned second controller that generates a laser beam changeable in three laser power levels to be used for data writing, reading, and erasing, respectively. The reading power is continuously generated and supplied when data of the CD-RW is read, and the erasing power is continuously generated and supplied when data of the CD-RW is erased. However, the data writing operation to the CD-RW requires a different technique.

More specifically, for the data writing operation to the CD-RW, the second controller supplies a laser beam that is set at the erasing power level continuously during a process of writing an area to be written as a blank area, which means no data. And, during a process of writing an area to be written as a pit area, which means an existence of data, the second controller normally supplies the laser beam that is set at the writing power level. To form the pit area in a better way on the CD-RW, the second controller is arranged to supply the laser beam that has a varying power in a form of multiple pulses, each pulse having a value of the writing power as a top peak value and a value of the reading power as a bottom peak value. Therefore, the CD-RW data writing operation also requires three power levels, the reading power, the erasing power, and the writing power in the order of increasing power.

It may be advantageous if the above-described second controller that produces a laser beam variable in three power levels can combine the controls of handling various different types of the optical disks such as the CD-R, the CD-RW, and so forth. However, in this case, a problem will occur on the CD-R during the one-time data writing operation. The problem is that an entire portion of the CD-R will wrongly be written as a pit when the erasing power for the CD-RW is equal to or greater than the one-time writing power for the CD-R. This is because, when the erasing power for the CD-RW is equal to or greater than the one-time writing power for the CD-R, the erasing power for the blank area becomes a writing power and the area to be kept as a blank will be written as data.

As a result, no blank area is made and, thus, the entire portion of the CD-R is wrongly written as a pit. Due to the fact that the erasing power for the CD-RW, which is the second strong power for the CD-RW data writing operation, is necessarily used an the writing power for the CD-R, which is the second strong power for the CD-R data writing operation, the above-described problem is unavoidable.

Because of the above-described problem, the controllers for the CD-R and the CD-RW are not possible to be combined together. Therefore, presently, there is no controller that is capable of handling various types of the optical media such as the CD-R and the CD-RW, for example.

SUMMARY OF THE INVENTION

Accordingly, an object of the present invention is to provide a novel laser beam controller that is capable of handling various types of optical media such as the CD-ROM, the CD-R, and the CD-RW, for example.

To achieve the above-mentioned object, the laser beam controller for an optical storage apparatus includes a laser beam generator, a laser beam power varier for varying the laser beam power to first, second, and third power levels, a memory for storing predetermined reference values including first reference values corresponding to the first power level and second reference values corresponding to the second power level, a light amount detector for detecting a light amount of the laser beam, a laser beam power corrector for correcting the laser beam power at the respective power level by comparing the light amount and a corresponding one of the predetermined reference values selected by a type of the compact disk in operation in the optical storage apparatus. The above-mentioned laser beam controller further includes a power level assigner for assigning the first power level to be used as a data reading power during the data reading mode when one of the CD-ROM, the CD-R, and the CD-RW types of compact disk is used, for assigning the first power level to be used as a base power, the third power level to be used as an initial power, and the second power level to be used as a data writing power during the data writing mode when the CD-R type compact disk is used, for assigning the first power level to be used as a bottom peak power in a data writing pulse, the second power level to be used as a base power, and the third power level to be used as a top peak power in the data writing pulse during the data writing mode when the CD-RW type compact disk in used, and for assigning the second power level to be used an erasing power during the date erasing mode when the CD-RW compact disk is used.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
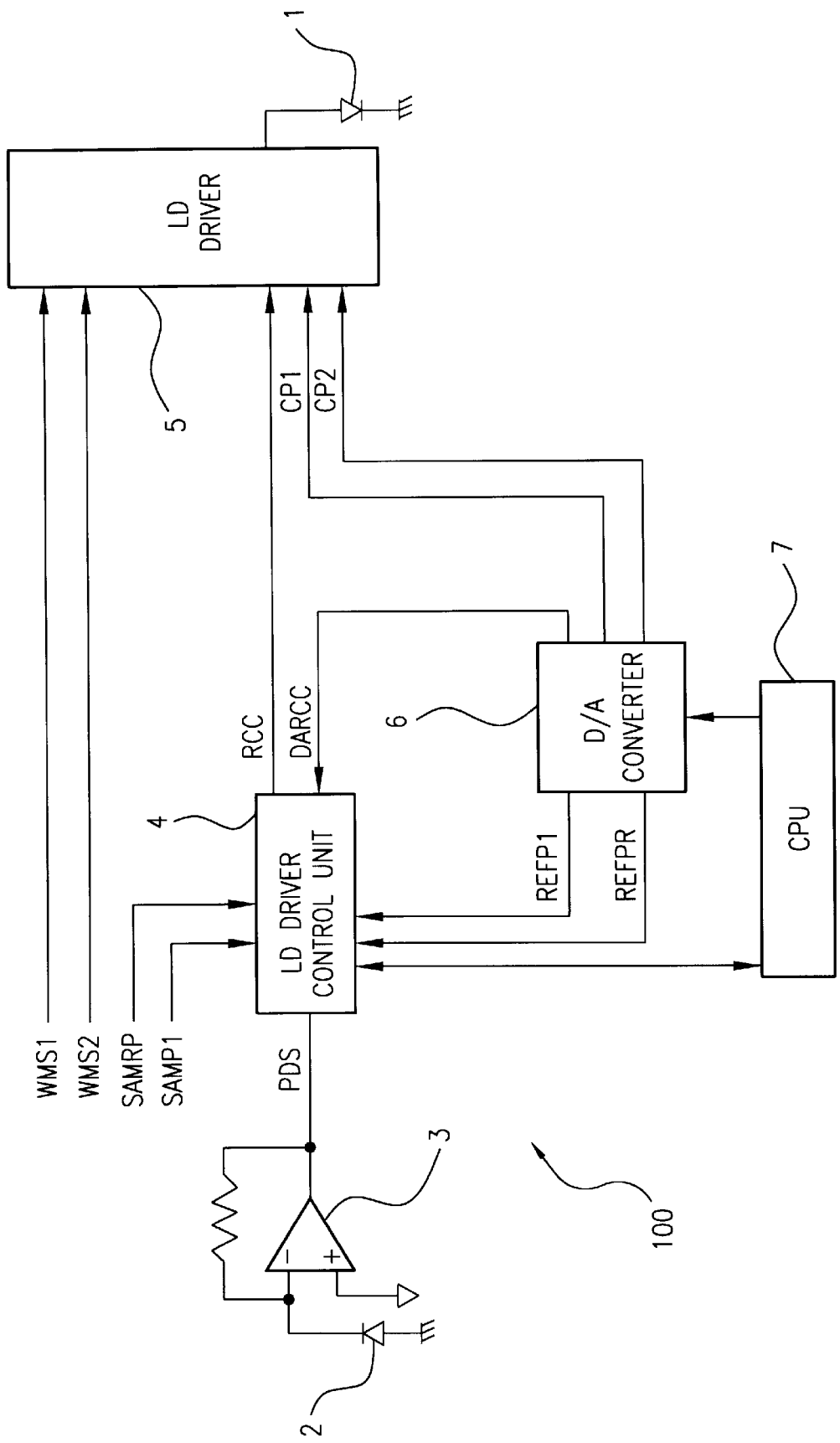
FIG. 1 is a block diagram of a novel laser beam controller for an optical storage apparatus according to the present invention.

In describing preferred embodiments of the present invention illustrated in the drawings, specific terminology is employed for the make of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a block diagram of a novel laser beam controller 100 of the present invention.

The laser beam controller 100 shown in FIG. 1 includes a laser diode (LD) 1, a photoreceptor 2, a current-to-voltage converting amplifier 3, an LD driver control circuit 4, an LD driver 5, a D/A (digital-to-analog) converter 6, and a central processing unit (CPU) 7.

In the laser beam controller 100, the LD 1 generates a laser beam which can be set at three power levels. The three power levels of the laser beam from the LD 1 are referred to as a RP (reading power), P1 (power 1), and P2 (power 2), respectively. The photoreceptor 2 senses the laser beam generated by the LD 1. When the photoreceptor 2 detects the laser beam generated by the LD 1, an electric current flows through the photoreceptor 2. The amplifier 3 connected to the photoreceptor 2 converts the current to a voltage and sends an output signal referred to as a PDS (photoreceptor detect signal) to the LD driver control circuit 4. The LD driver control circuit 4 generates an output signal referred to as a RCC (reading current control) and mends the RCC to the LD driver 5 so as to set the power of the laser beam to the RP. The control of the laser beam power by the RCC is made through the mediation of the D/A converter 6 and the CPU 7.

In this embodiment, a unit length of a pit to be written on the media, such as the CD-R, CD-RW, and CD-ROM, for example, is set to the number of periods of the basic clock of, for example, approximately 4.5-MHz; the pit length varies in a range from three clock periods (referred to as a 3T), for example, to 11 clock periods (referred to as an 11T), for example.

The LD driver control circuit 4 receives power level sampling signal, referred to as SAMRP (sampling reading power) and SAMP1 (sampling power 1), respectively, from an encoder (not shown). The LD driver 5 receives first and second write modulation signals that are referred to as an WMS1 (write-modulation signal 1) and an WMS2 (write-modulation signal 2), also from the encoder (not shown). These WMS1 and WMS2 are made based on a basic write-modulation signal WMS which is not shown. The D/A converter 6 sends signals that are a DARCC (digital-to-analog reading current control), a REFRP (reference reading power), and a REFP1 (reference power 1) to the LD driver control circuit 4. Also, the D/A converter 6 sends signals that are a CP1 (current power 1) and CP2 (current power 2) to the LD driver 5.

The above-mentioned various signals are summarized as follows:

the WMS1 switches the power level of the layer beam to the P1;

the WMS2 switches the power level of the laser beam to the P2;

the SAMRP samples the RP;

the SAMP1 samples the P1;

the RCC is a current signal for driving the LD 1 to generate the RP;

the DARCC is a current signal for driving the LD 1 to generate the RP during a data writing operation to a CD-RW;

the REFRP in a reference signal for the RP;

the REFP1 is a reference signal for the P1;

the CP1 drives the P1; and the CP2 drives the P2.

The laser beam controller 100 has the configuration as described above.

Figure 2:
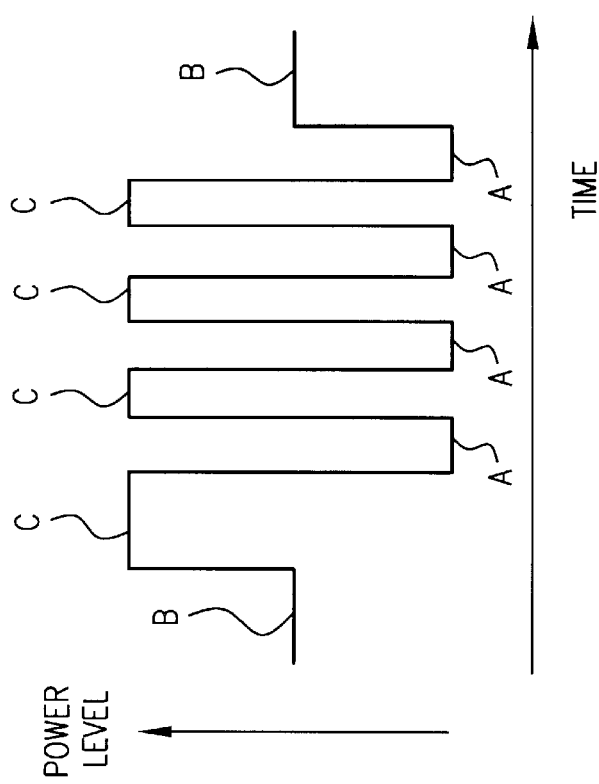
FIG. 2 shows a waveform representing a laser beam power in a case of a data writing operation to a CD-R.

Next, power levels of the laser beam are explained with reference to FIGS. 2 and 3. FIG. 2 shows a waveform of the laser beam during the one-time data writing operation to the CD-R. This waveform is similar to a typical waveform of the laser beam formed during the one-time data writing operation to the CD-R using a conventional compact disk driving apparatus.

As shown in FIG. 2, the LD 1 changes the laser power of the laser beam from a base level, the RP (indicated by letters A), to an initial high level, the P2 (indicated by a letter C), and maintains the P2 for a relatively short time period. Then, the LD 1 again changes the laser power to, a constant data writing level, the P1 (indicated by a letter B), that in the necessary laser power for writing the CD-R, maintains the P1 for the successive time period, and again changes the laser power from the P1 to the base level RP. In this way, the RP, the P1, and the P2 are used as base, data writing, and initial powers, respectively, during the one-time data writing operation to the CD-R. In addition, the reading power RP is constantly used during the data reading operation to be performed to the CD-R.

Figure 3:
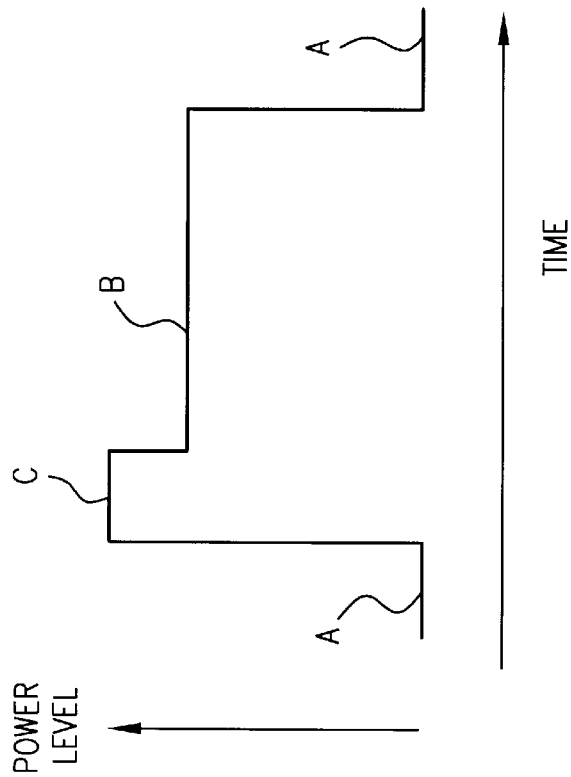
FIG. 3 shown a waveform representing a laser beam power in a case of the data writing operation to a CD-RW.

FIG. 3 shows a waveform of the laser beam generated by the LD 1 of the laser beam controller 100 during the data writing operation to the CD-RW. An shown in FIG. 3, the LD 1 generates the laser beam with the power level P1 (indicated by letters B) for a blank area during the data writing operation. Then, the LD 1 changes the laser beam power level so as to form a multiple-pulse as shown in FIG. 3. The power strength of the multiple-pulse is determined by a top peak level with a value of the P2 (indicated by letters C) and a bottom peak level with a value of the RP (indicated by letters A). In this case, the RP, the P1, and the P2 are used as bottom data writing, erasing, and top data writing powers, respectively, during the data writing operation to the CD-RW. In addition, the RP is constantly used during the data reading operation to be performed on the CD-RW. Further, in addition, the P1 is constantly used during the data erasing operation to be performed on the CD-RW.

Figure 4:
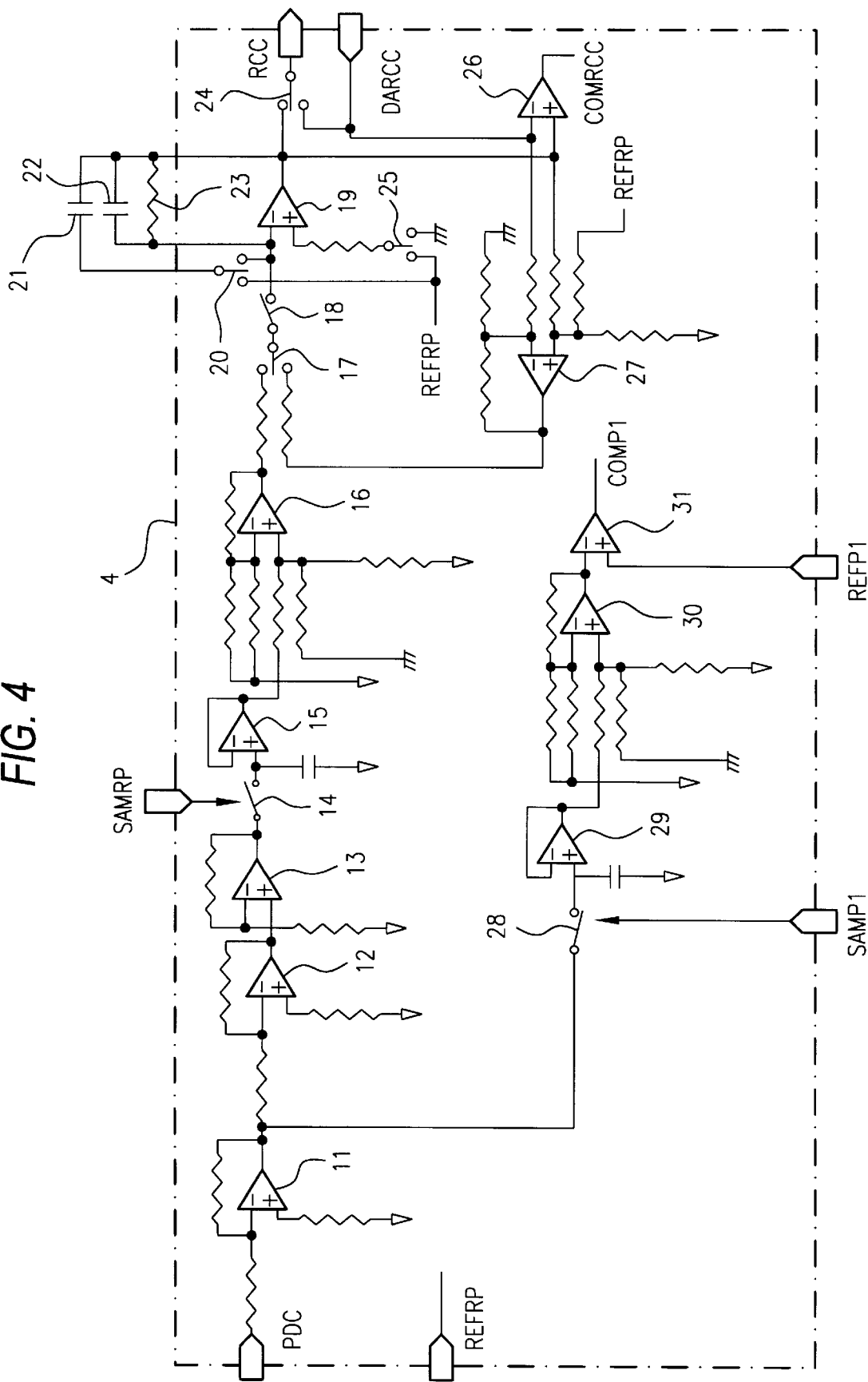
FIG. 4 is a circuit diagram of the LD (laser diode) driver control unit for the optical storage apparatus shown in FIG. 1.

Next, a circuit configuration of the LD driver control circuit 4 of the laser beam controller 100 is explained with reference to FIG. 4. The LD driver control circuit 4 includes a variable gain amplifier 11, a first signal amplifier 12, a second signal amplifier 13, a first switch 14, and a first sample-and-hold amplifier 15, a first voltage level converter 16, a second switch 17, a third switch 18, and a signal control amplifier 19, a fourth switch 20, a first capacitor 21, a second capacitor 22, a first register 23, a fifth switch 24, and a sixth switch 25, a first comparator 26, and a third signal amplifier 27.

The LD driver control circuit 4 further includes a seventh switch 28, a second sample-and-hole amplifier 29, a second voltage level converter 30, and a second comparator 31.

The output terminal of the variable gain amplifier 11 is connected to the first sample-and-hold amplifier 15 through the first signal amplifier 12, the second signal amplifier 13, and the first switch 14 which are connected in series in this order. The output terminal is the first sample-and-hold amplifier 15 is connected to the negative input terminal of the signal control amplifier 19 through the first voltage level converter 16, second switch 17, and the third switch 18 which are connected in series in this order. The negative input terminal and the output terminal of the signal control amplifier 19 are connected with each other through the fifth switch 20 and the first capacitor 21 which are connected in series, and also through the second capacitor 22 and the register 23 which are connected in parallel.

Also, the output terminal of the variable gain amplifier 11 is connected to the seventh switch 28, the second sample-and-hold amplifier 29, the second voltage level converter 30, and the second comparator 31 in series in this order.

How the laser beam controller 100 controls the laser beam power level during data reading operations to be performed on the CD-R, the CD-RW, the CD-ROM, and the like is explained next. The PDS, the output signal from the current-to-voltage converting amplifier 3, in amplified by the variable gain amplifier 11 of the LD driver control circuit 4. The gain of the variable gain amplifier 11 can be varied by an instruction from the CPU 7, so that an amount of light emitted from the LD 1 is adjusted to a level of 30 mV at 0.6 mW, for example.

Then, the PDS is amplified through the first and second amplifiers 12 and 13, and inputted to the voltage level converter 6 through the first sample-and-hold amplifier 15. The first sample-and-hold amplifier 15 is set to a sample operation made by the first switch 14 which is switched by the SAMRP sent from the encoder (not shown) during the reading operation. The voltage level converter 16 has an input of a reference voltage that is set to the ground level, and is set at a necessary gain level. An output from the voltage level converter 16 is inputted to the signal control amplifier 19. The second, third, fourth, fifth, and sixth switches 17, 18, 20, 24, and 25 disposed around the signal control amplifier 19 are set to the following respective conditions:

the second switch 17 is set to connect the voltage level converter 16 to the signal control amplifier 19;

the third switch 18 is set to an on-condition;

the fourth switch 20 is set to connect the first capacitor 21 to the REFRP;

the fifth switch 24 is set to connect the signal control amplifier 19 to the RCC; and the sixth switch 25 is set to connect the signal control amplifier 19 to the REFRP.

Setting the switches 17, 18, 20, 24, and 25, in this manner the signal control amplifier 19 to reduce its output when the output of the voltage level converter 16 is greater than the REFRP and to increase its output When the output of the voltage level converter 16 is lesser than the REFRP. Then, the RCC is varied in accordance with the variation of the output from the signal control amplifier 19, and is inputted to the LD driver 5. Then, the LD driver 5 supplies the current, which is varied in accordance with the variation of the RCC, to the LD 1. As a result, the LD 1 is supplied with a varying current by the LD driver 5 so as to emit a constant light amount of the laser beam during the operation of reading the CD-R, CD-RW, CD-ROM, and so forth. In this way, the laser beam is constantly generated at the reading power RP during the data reading operation.

To change the reading power of the laser beam for the different media, such as the CD-R, CD-RW, or CD-ROM, for example, the CPU 7 instructs the D/A converter 6 to change the value of the REFRP.

Figure 5:
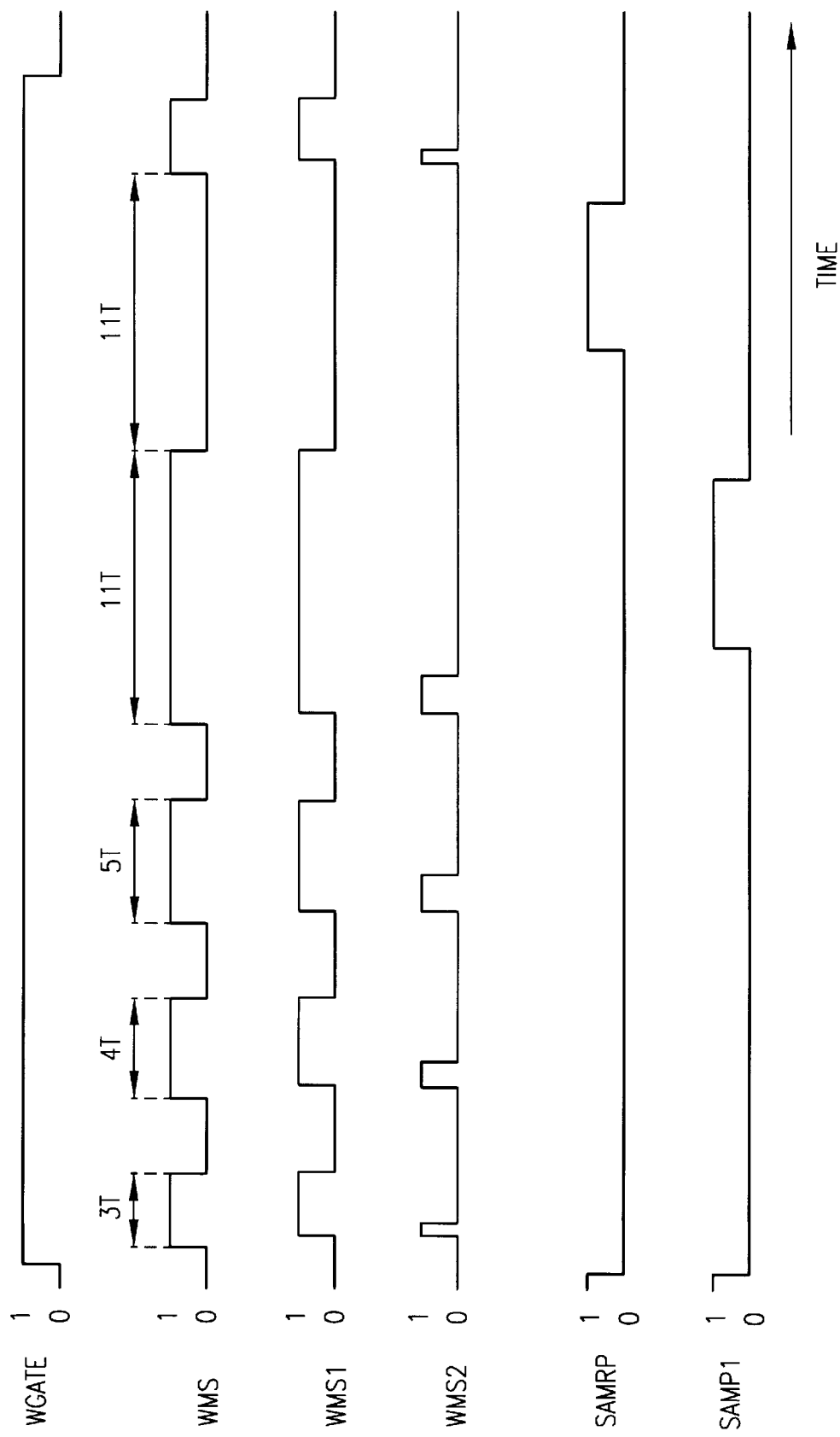
FIG. 5 is a time chart for explaining timings of a plurality of signals used during the data writing operation to the CD-R.

Next, how the laser beam controller 100 controls the laser beam power level during the one-time data writing operation to be performed on the CD-R is explained with reference to FIGS. 1 and 5. A waveform pattern of the laser beam power during the one-time data writing operation to the CD-R may be referred to FIG. 2. A timing chart of the writing operation of the CD-R is shown in FIG. 5. As described above, the WMS1 and WMS2 are generated on the basis of the write modulation signal (WMS), and switch the beam powers P1 and P2. The WMS determines alternate time periods of pits and blanks, an shown in FIG. 5. The RP, P1, and P2 are switched by the WMS1 and WMS2, as shown in FIG. 5.

A WGATE (write gate) is necessarily turned to a high state to start the data writing operation. The first sample-and-hold amplifier 13 is normally set to a holding mode by the first switch 14 when the WGATE is in the high state. Only when a blank is greater than 11T, meaning that the WMS falls for a period of 11T or more, the SAMRP is outputted from the encoder (not shown), so as to activate the first switch 14 to switch the sample-and-hold amplifier 15 to the sampling mode. Thus, the reading power RP is sampled.

The sampled RP is inputted to the signal control amplifier 19 via the voltage level converter 16 and the second and third switches 17 and 18. The second, third, fourth, fifth, and sixth switches 17, 18, 20, 24, and 25 disposed around the signal control amplifier 19 are set to the following respective conditions:

the second switch 17 is set to to connect the voltage level converter 16 to the signal control amplifier 19;

the third switch 18 is set to an on-condition;

the fourth switch 20 is set to connect the first capacitor 21 to the second capacitor 22;

the fifth switch 24 is set to connect the signal control amplifier 19 to the RCC; and the sixth switch 25 is set to connect the signal control amplifier 19 to the REFRP.

By the thus-arranged setting of the switches 17, 18, 20, 24, and 25, the signal control amplifier 19 is caused to compare the output from the voltage level converter 16 and the REFRP so as to determine the reading power RP. The RP then becomes the RCC and is inputted to the LD driver control circuit 4 so as to drive the LD 1 at the reading power RP. The first and second capacitor 22 and 23 connected in series by the fourth switch 20 protect the signal control amplifier 19 from turning into an unstable condition. In this way, the laser beam controller 100 controls the laser beam power level so as to set the base level of the waveform of the laser beam during the one-time data writing operation to the reading power RP.

As describe above, the WGATE (write gate) is necessarily turned to the high state when the data writing operation is started. The second sample-and-hold amplifier 13 is normally set to a holding mode by the first switch 14 when the WGATE is set to the high state. Only when a pit is greater than a predetermined time value, 10T, for example, meaning that the WMS risen for a period of 11T or more, the SAMP1 is outputted from the encoder (not shown), so as to activate the seventh switch 28 to switch the sample-and-hold amplifier 29 to the sampling mode. The writing power P1 is thereby sampled and held by the second sample-and-hold amplifier 29 during the SAMP1.

Then, the output of the second sample-and-hold amplifier 29 is inputted to the second voltage level converter 30 and converted to a signal referred to the ground level. Then, the output from the second voltage level converter 30 is inputted to the second comparator 31 and compared with the REFP1 supplied from the D/A converter 6.

The output terminal of the second comparator 31 is arranged to be read by the CPU 7, and the signal COMP1 (comparator power 1) outputted from second comparator 31 is read by the CPU 7. Then, when determining by the COMP1 that the value of the sampled P1 is greater than the value of the REFP1, the CPU 7 instructs the D/A converter 6 to decrease the value of the CP1 so that the current for driving the LD 1 can be decreased. Thereby, the writing power P1 is decreased.

When determining by the COMP1 that the value of the sampled P1 in smaller than the value of the REFP1, the CPU 7 instructs the D/A converter 6 to increase the value of the CP1 so that the current for driving the LD 1 can be increased. Thereby, the writing power P1 is increased.

In addition, the laser beam controller 100 determines a value of the P2 in accordance with the value of the P1 with a predetermined proportion and sets the initial writing power level to value of the thus-determined P2.

In this way, the laser beam controller 100 controls the laser beam power level during the one-time data writing operation to be performed on the CD-R so as to set the data writing power to the writing power P1.

Figure 6:
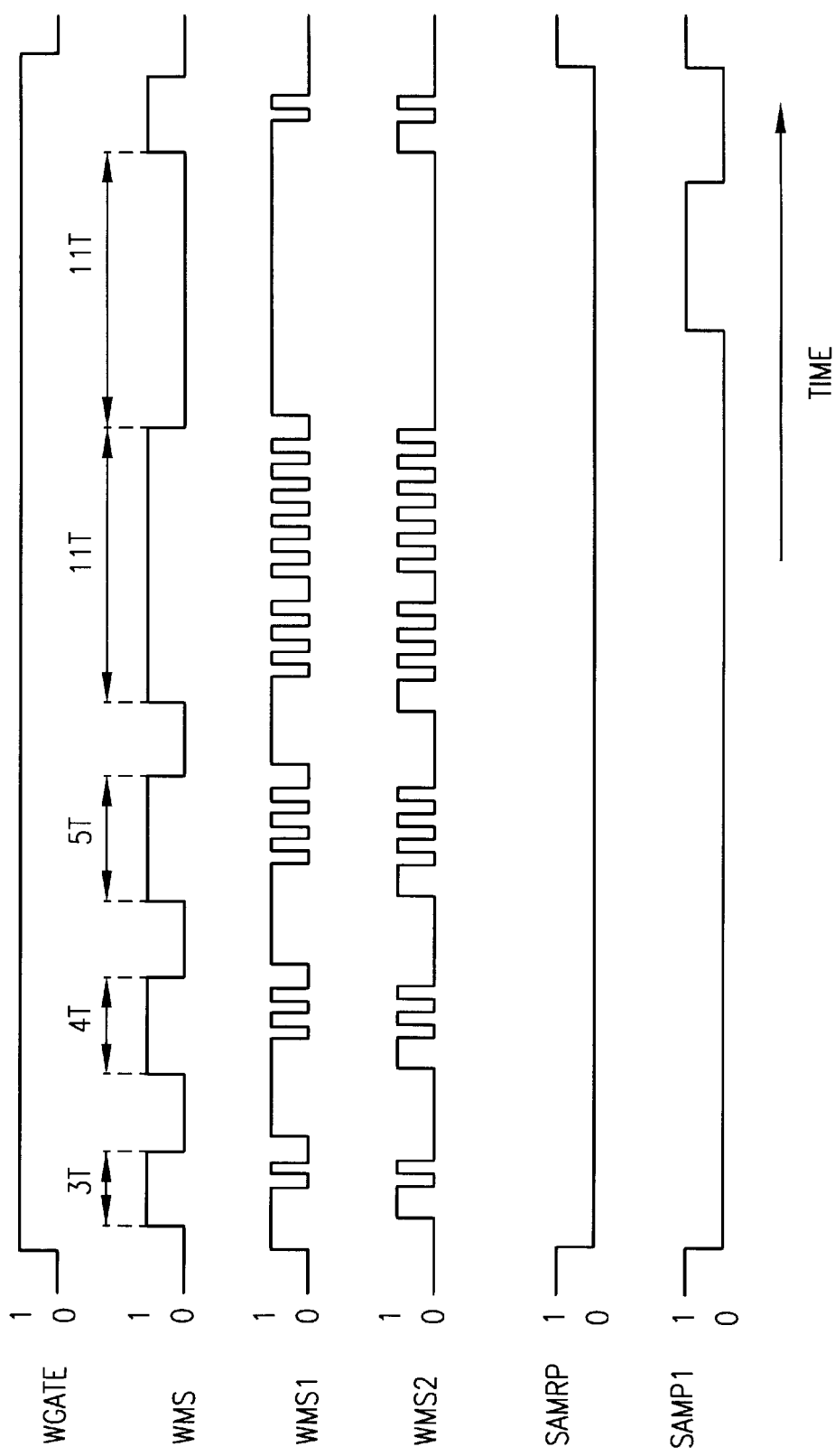
FIG. 6 is a time chart for explaining timings of the same plurality of the signals used during the data writing operation to the CD-RW.

Next, how the laser beam controller 100 controls the laser beam power level during the many-time data writing operation to be performed on the CD-RW is explained with reference to FIGS. 2 and 6. For the data writing operation to the CD-RW, the value of the signal DARCC outputted from the D/A Converter 6 is adjusted by the CPU 7 before the data writing operation starts, in the following way. During the time of the previous data reading operation in which the reading power RP is constantly used, the signal DARCC inputted from the D/A converter 6 is compared with the output from the signal control amplifier 19 by the first comparator 26, and the resultant signal COMRCC is read by the CPU 7. The CPU 7 then determines the value of the DARCC based on the value of the resultant signal, so as to set the value of the signal DARCC equal to the value of the output signal from the signal control amplifier 19 which is the reading power RP.

In the data writing operation including an overwriting operation, the signal waveform of the laser beam power is formed as shown in FIG. 2. The signal waveform of the laser beam power during the data writing operation includes the PR, the P1, and the P2. A timing chart of the operation of writing the CD-RW is shown in FIG. 6. An described above, the WMS1 and WMS2 are generated on the basis of the write modulation signal (WMS), and switch the beam powers P1 and P2. The WMS determines alternate time periods of pits and blanks, as shown in FIG. 6. The RP, P1, and P2 are switched by the WMS1 and WMS2, as shown in FIG. 6.

When the WGATE (write gate) is necessarily turned to a high state during the data writing operation, the switches 17, 18, 20, 24, and 25 disposed around the signal control amplifier 19 are act in the following respective conditions:

the second switch 17 is set to connect the third signal amplifier 27 to the signal control amplifier 19;

the third switch 18 is set to an on-condition;

the fourth switch 20 is set to connect the first capacitor 21 to the second capacitor 22;

the fifth switch 24 is set to connect the signal DARCC to the RCC; and the sixth switch 25 is set to connect the signal control amplifier 19 to the REFRP.

By the thus-arranged setting of the switches 17, 18, 20, 24, and 25, the signal DARCC is inputted to the LD driver control circuit 5 to drive the LD 1 so as to generate the laser beam power RP as the bottom data writing power during the many-time data writing operation.

At the same time, the third signal amplifier 27 compares the output signal from the signal control amplifier 19 and the DARCC and sends an output signal to the signal control amplifier 19, so that the output signal of the signal control amplifier 19 is equal to the DARCC. Thereby, the output signal of the signal control amplifier 19 is made equal to the DARCC, so that the LD 1 can be correctly controlled without abnormally emitting the light especially when the data writing operation is ended and the signal control amplifier 19 again sends the RCC to the LD drive control circuit 5 to drive the LD 1 so as to generate the laser beam at the reading power RP.

When a blank is greater than a predetermined time value, 10T, for example, meaning that the WMS falls for a period of 11T or more, the SAMP1 is outputted from the encoder (not shown), so as to activate the seventh switch 28 to switch the sample-and-hold amplifier 29 to the sampling mode. The writing power P1 in thereby sampled and held by the second sample-and-hold amplifier 29 during the SAMP1.

Then, the output of the second sample-and-hold amplifier 29 is inputted to the second voltage level converter 30 and converted to a signal referred to the ground level. Then, the output from the second voltage level converter 30 is inputted to the second comparator 31 and compared with the REFP1 supplied from the D/A converter 6.

The output terminal of the second comparator 31 is arranged to be read by the CPU 7, and the signal COMP1 (comparator power 1) outputted from second comparator 31 in read by the CPU 7. Then, when determining by the COMP1 that the value of the sampled P1 is greater than the value of the REFP1, the CPU 7 instructs the D/A converter 6 to decrease the value of the CP1 so that the current for driving the LD 1 can be decreased. Thereby, the writing power P1 is decreased.

When determining by the COMP1 that the value of the sampled P1 is smaller than the value of the REFP1, the CPU 7 instructs the D/A converter 6 to increase the value of the CP1 so that the current for driving the LD 1 can be increased. Thereby, the writing power P1 is increased.

In addition, the laser beam controller 100 determines a value of the P2 in accordance with the value of the P1 with a predetermined proportion and sets the initial writing power level to value of the thus-determined P2.

In this way, the laser beam controller 100 controls the laser beam power level during the many-time data writing operation to be performed on the CD-RW.

Next, how the laser beam controller 100 controls the laser beam power level during the data erasing operation to be performed on the CD-RW is explained. During the data erasing operation, the SAMP1 is always made active and the second sample-and-hold amplifier 29 is set to the sampling mode so that the laser beam power can be controlled constantly to the P1. In this way, the laser beam controller 100 controls the laser beam power level during the data erasing operation to be performed on the CD-RW.

As described above, the laser beam controller 100 can perform the controls of data reading, writing, and erasing operations on the various different types of media such as the CD-ROM, the CD-R, and the CD-RW without causing a problem in that an entire portion of the CD-R is made as a pit by the erasing power P1 during the data writing operation.

Figure 7:
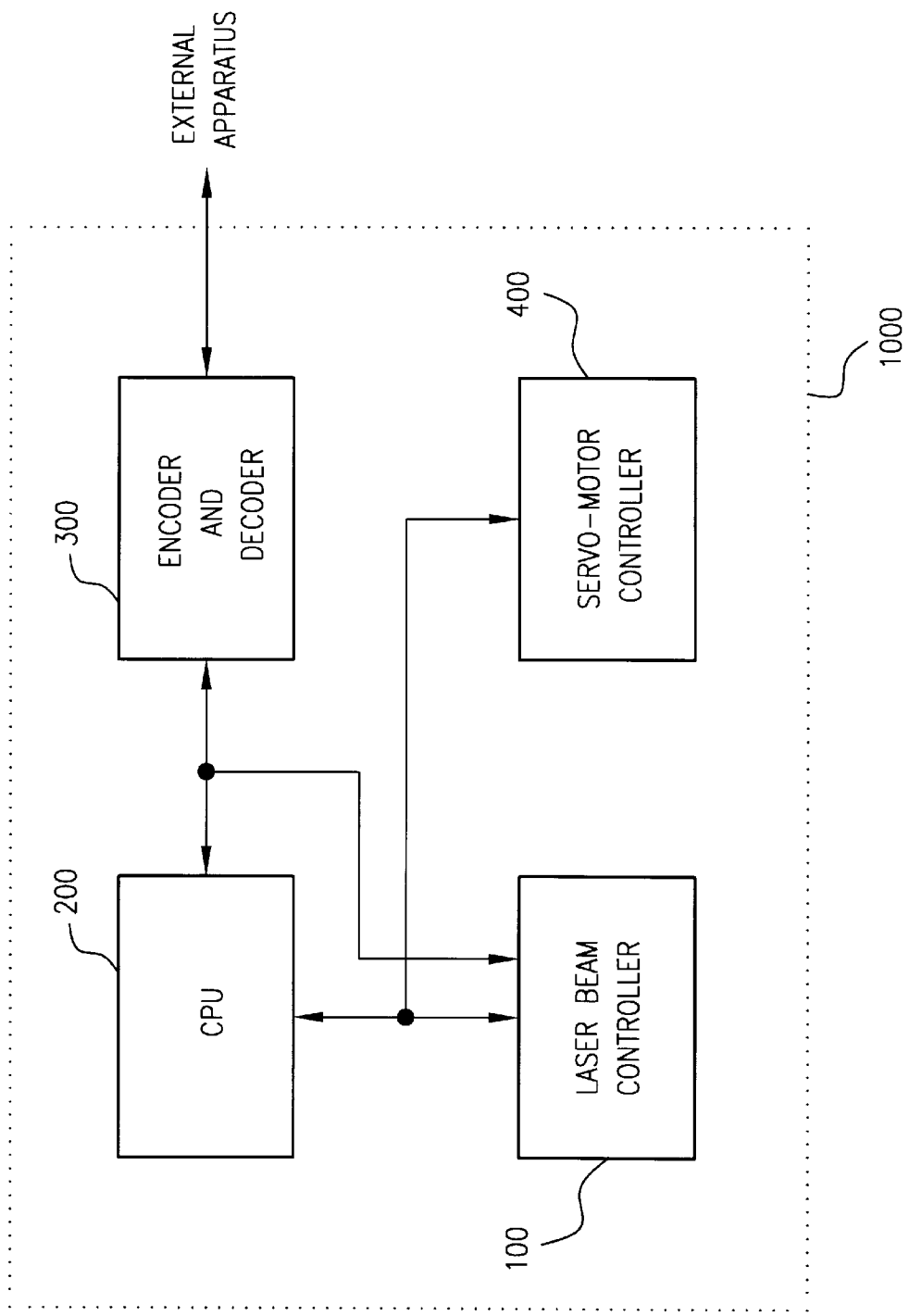
FIG. 7 shows an example of the optical storage apparatus including the novel laser beam controller shown in FIG. 1.

Next, an example of an optical storage apparatus that includes the above-described laser beam controller 100 is explained with reference to the compact disk driving apparatus of FIG. 7. In addition to the laser beam controller 100, the compact disk driving apparatus 1000 includes a CPU 200, an encoder/decoder 300, and servo-motor controller 400. The CPU 200 controls the entire operation of the compact disk driving apparatus 1000 and may be combined with the one used in the laser beam controller 100.

The encoder/decoder 300 interfaces with an external apparatus, much as a computer, a computer-game machine, and so forth, encodes data received from the external apparatus and decodes data transmitted to the external apparatus. In addition, the encoder and decoder 300 includes a data buffer for temporarily storing the received data from the external apparatus, and sends the data with a plurality of timing signals, such as the WMS1, WMS2, SAMRP, and SAMP1, for example, to the CPU. The servo-motor controller 400 controls a driving of a servo-motor for rotating a compact disk that is inserted in the compact disk driving apparatus 1000.

The thus-arranged compact disk driving apparatus 1000 can perform the data reading operation on the CD-ROM, CD-R, CD-RW, and so forth, the one-time data recording operation on the CD-R, the many-time data rewriting operation on the CD-RW, and the data erasing operation to the CD-RW.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent application No. JPAP09055918 filed in the Japanese Patent Office on Mar. 11, 1997, the entire contents of which are hereby incorporated by reference.

What is claimed as new and is desired to be secured by Letters Patent of the United States is:

1. A laser beam controller for an optical storage apparatus having at least data writing, data reading, and data erasing modes and compatible with at least read-only-memory, one-time-recordable, and many-time-erasable-recordable types of compact disk, maid laser beam controller comprising:

laser beam generating means for generating a laser beam;

laser beam power varying means for varying laser beam power to a plurality of power levels including at least first, second, and third power levels;

storing means for storing a plurality of predetermined reference values including a plurality of first reference values corresponding to said laser beam power at said first power level and a plurality of second reference values corresponding to said laser beam power at said second power level;

light amount detecting means for detecting a light amount of said laser beam generated by said laser beam generating means;

laser beam power correcting means for correcting said laser beam power at the respective power level by comparing said light amount detected by said light amount detecting means and a corresponding one of said plurality of said predetermined reference values selected by a type of said compact disk in operation in said optical storage apparatus;

power level assigning means for assigning said first power level to be used as a data reading power during a time of said data reading mode when one of said read-only-memory, said one-time-recordable, and said many-time-erasable-recordable types of said compact disk is in operation in said optical storage apparatus, for assigning said first power level to be used as a base power, said third power level to be used as an initial power, and said second power level to be used as a data writing power during a time of said data writing mode when said one-time-recordable type of said compact disk is in operation in said optical storage apparatus, for assigning said first power level to be used as a bottom peak power in a data writing pulse, said second power level to be used as a base power, and said third power level to be used as a top peak power in said data writing pulse during a time of said data writing mode when said many-time-erasable-rewritable type of said compact disk is in operation in said optical storage apparatus, and for assigning said second power level to be used as an erasing power during a time of said data erasing mode when said many-time-erasable-rewritable type of said compact disk is in operation in said optical storage apparatus.

2. The laser beam controller according to claim 1, wherein said laser beam power correcting means corrects said laser beam power at said first power level using an analog form controlling method during a time of said data reading mode when one of said one-time-recordable and said many-time-erasable-rewritable type compact disks is in operation in said optical storage apparatus, wherein said laser beam power correcting means corrects said laser beam power at said first power level using said analog form controlling method with a data sampling operation, said laser beam power at said second power level using a digital form controlling method with said data sampling operation, and said laser beam power at said third power level using a predetermined calculation on the basis of said second power level during a time of said data writing mode when one of said one-time-recordable type compact disk is in operation in said optical storage apparatus, and wherein said laser beam power correcting means corrects said laser beam power at said first power level using a digital form controlling method, said laser beam power at said second power level using a digital form controlling method with said data sampling operation, and said laser beam power at said third power level using a predetermined calculation on the basis of said second power level during a time of said data writing mode when said many-time-erasable-rewritable type compact disk is in operation in said optical storage apparatus.

3. The laser beam controller according to claim 2, wherein said laser beam power at said third power level is determined using a predetermined calculation on the basis of the ratio of said third power level to said second power level.

4. The laser beam controller according to claim 3, wherein said laser beam power correcting means previously corrects said laser beam power at said first power level to be used during said time of said data writing mode using said laser beam power at said first power level that has been used during said time of said data reading mode, for said time of said data writing mode when said many-time-erasable-rewritable type compact disk in operation in said optical storage apparatus.

5. The laser beam controller according to claim 4, wherein said laser beam power correcting means previously corrects said laser beam power at said first power level to be used during said time of said data writing mode to an equal value of said laser beam power at said first power level that has been used during said time of said data reading mode.

6. The laser beam controller according to claim 2, wherein said laser beam power correcting means previously corrects said laser beam power at said second power level using a digital form controlling method with said data sampling operation based on a dummy laser beam generated by said laser beam generating means before said optical storage apparatus starts to control said compact disk in operation by a servo control.

7. The laser beam controller according to claim 6, wherein said laser beam power correcting means previously corrects said laser beam power at said first power level to be used during said time of said data writing mode using said laser beam power at said first power level that has been used during said time of said data reading mode, for said time of said data writing mode when said many-time-erasable-rewritable type compact disk is in operation in said optical storage apparatus.

8. The laser beam controller according to claim 7, wherein said laser beam power correcting means previously corrects said laser beam power at said first power level to be used during said time of said data writing mode to an equal value of said laser beam power at said first power level that has been used during said time of said data reading mode.

9. The laser beam controller according to claim 2, wherein said laser beam power correcting means previously corrects said laser beam power at said first power level to be used during said time of said data writing mode using said laser beam power at said first power level that has been used during said time of said data reading mode, for said time of said data writing mode when said many-time-erasable-rewritable type compact disk is in operation in said optical storage apparatus.

10. The laser beam controller according to claim 9, wherein said laser beam power correcting means previously corrects said laser beam power at said first power level to be used during said time of said data writing mode to an equal value of said laser beam power at said first power level that has been used during said time of said data reading mode.

11. The laser beam controller according to claim 1, wherein said laser beam power at said third power level is determined using a predetermined calculation on the basis of the ratio of said third power level to said second power level.

12. The laser beam controller according to claim 11, wherein said laser beam power correcting means previously corrects said laser beam power at said first power level to be used during said time of said data writing mode using said laser beam power at said first power level that has been used during said time of said data reading mode, for said time of said data writing mode when said many-time-erasable-rewritable type compact disk is in operation in said optical storage apparatus.

13. The laser beam controller according to claim 12, wherein said laser beam power correcting means previously corrects said laser beam power at said first power level to be used during said time of said data writing mode to an equal value of said laser beam power at said first power level that has been used during said time of said data reading mode.

14. The laser beam controller according to claim 1, wherein said laser beam power correcting means previously corrects said laser beam power at said second power level using a digital form controlling method with said data sampling operation based on a dummy laser beam generated by said laser beam generating means before said optical storage apparatus starts to control said compact disk in operation by a servo control.

15. The laser beam controller according to claim 14, wherein said laser beam power correcting means previously corrects said laser beam power at said first power level to be used during said time of said data writing mode using said laser beam power at said first power level that has been used during said time of said data reading mode, for said time of said data writing mode when said many-time-erasable-rewritable type compact disk is in operation in said optical storage apparatus.

16. The laser beam controller according to claim 15, wherein said laser beam power correcting means previously corrects said laser beam power at said first power level to be used during said time of said data writing mode to an equal value of said laser beam power at said first power level that has been used during said time of said data reading mode.

17. The laser beam controller according to claim 1, wherein said laser beam power correcting means previously corrects said laser beam power at said first power level to be used during said time of said data writing mode using said laser beam power at said first power level that has been used during said time of said data reading mode, for said time of said data writing mode when said many-time-erasable-rewritable type compact disk is in operation in said optical storage apparatus.

18. The laser beam controller according to claim 17, wherein said laser beam power correcting means previously corrects said laser beam power at said first power level to be used during said time of said data writing mode to an equal value of said laser beam power at said first power level that has been used during said time of said data reading mode.

19. A laser beam controller for an optical storage apparatus having at least data writing, data reading, and data erasing modes and compatible with at least read-only-memory, one-time-recordable, and many-time-erasable-recordable types of compact disk, said laser beam controller comprising;

a laser beam generator for generating a laser beam;

a laser beam power varier for varying said laser beam power to a plurality of power levels including at least first, second, and third power levels;

a memory for storing a plurality of predetermined reference values including a plurality of first reference values corresponding to said laser beam power at said first power level and a plurality of second reference values corresponding to said laser beam power at said second power level;

a light amount detector for detecting a light amount of said laser beam generated by said laser beam generator;

a laser beam power corrector for correcting said laser beam power at the respective power level by comparing said light amount detected by said light amount detector and a corresponding one of said plurality of said predetermined reference values selected by a type of said compact disk in operation in said optical storage apparatus;

a power level assigner for assigning said first power level to be used as a data reading power during a time of said data reading mode when one of said read-only-memory, said one-time-recordable, and said many-time-erasable-recordable types of said compact disk is in operation in said optical storage apparatus, for assigning said first power level to be used an a base power, said third power level to be used as an initial power, and said second power level to be used as a data writing power during a time of said data writing mode when said one-time-recordable type of said compact disk is in operation in said optical storage apparatus, for assigning said first power level to be used as a bottom peak power in a data writing pulse, said second power level to be used as a base power, and said third power level to be used as a top peak power in said data writing pulse during a time of said data writing mode when said many-time-erasable-rewritable type of said compact disk is in operation in said optical storage apparatus, and for assigning said second power during be used as an erasing power during a time of said data erasing mode when said many-time-erasable-rewritable type of said compact disk is in operation in said optical storage apparatus.

20. The laser beam controller according to claim 19, wherein said laser beam power corrector corrects said laser beam power at said first power level using an analog form controlling method during a time of said data reading mode when one of said one-time-recordable and said many-time-erasable-rewritable type compact disks is in operation in said optical storage apparatus, wherein said laser beam power corrector corrects said laser beam power at said first power level using said analog form controlling method with a data sampling operation, said laser beam power at said second power level using a digital form controlling method with said data sampling operation, and said laser beam power at said third power level using a predetermined calculation on the basis of said second power level during a time of said data writing mode when one of said one-time-recordable type compact disk is in operation in said optical storage apparatus, and wherein said laser beam power corrector corrects said laser beam power at said first power level using a digital form controlling method, said laser beam power at said second power level using a digital form controlling method with said data sampling operation, and said laser beam power at said third power level using a predetermined calculation on the basis of said second power level during a time of said data writing mode when said many-time-erasable-rewritable type compact disk is in operation in said optical storage apparatus.

21. The laser beam controller according to claim 19, wherein said laser beam power at said third power level is determined using a predetermined calculation on the basis of the ratio of said third power level to said second power level.

22. The laser beam controller according to claim 19, wherein said laser beam power corrector previously corrects said laser beam power at said second power level using a digital form controlling method with said data sampling operation based an a dummy laser beam generated by said laser beam generator before said optical storage apparatus starts to control said compact disk in operation by a servo control.

23. The laser beam controller according to claim 19, wherein said laser beam power corrector previously corrects said laser beam power at said first power level to be used during said time of said data writing mode using said laser beam power at said first power level that has been used during said time of said data reading mode, for said time of said data writing mode when said many-time-erasable-rewritable type compact disk is in operation in said optical storage apparatus.

24. The laser beam controller according to claim 23, wherein said laser beam power corrector previously corrects said laser beam power at said first power level to be used during said time of said data writing mode to an equal value of said laser beam power at said first power level that has been used during said time of said data reading mode.

25. A method for controlling a laser beam in an optical storage apparatus having at least data writing, data reading, and data erasing modes and compatible with at least read-only-memory, one-time-recordable, and many-time-erasable-recordable types of compact disk, said method comprising the steps of:

generating a laser beam with a laser beam generator;

varying said laser beam power to a plurality of power levels including at least first, second, and third power levels;

storing a plurality of predetermined reference values including a plurality of first reference values corresponding to said laser beam power at said first power level and a plurality of second reference values corresponding to said laser beam power at said second power level;

detecting a light amount of said laser beam generated by said laser beam generator;

correcting, said laser beam power at the respective power level by comparing said light amount detected by said step of detecting said light amount and a corresponding one of said plurality of said predetermined reference values selected according to a type of said compact disk in operation in said optical storage apparatus;

assigning said first power level to be used as a data reading power during a time of said data reading mode when one of said read-only-memory, said one-time-recordable, and said many-time-erasable-rewritable types of said compact disk is in operation in said optical storage apparatus;

assigning said first power level to be used as a base power, said third power level to be used as an initial power, and said second power level to be used as a data writing power during a time of said data writing mode when said one-time-recordable type of said compact disk is in operation in said optical storage apparatus;

assigning said first power level to be used as a bottom peak power in a data writing pulse, said second power level to be used as a base power, and said third power level to be used as a top peak power in said data writing pulse during a time of said data writing mode when said many-time-erasable-rewritable type of said compact disk is in operation in said optical storage apparatus; and assigning said second power level to be used as an erasing power during a time of said data erasing mode when said many-time-erasable-rewritable type of said compact disk is in operation in said optical storage apparatus.

26. The method according to claim 25, wherein during said step of correcting said laser beam power said laser beam power corrector corrects said laser beam power at said first power level using an analog form controlling method during a time of said data reading mode when one of said one-time-recordable and said many-time-erasable-rewritable type compact disks is in operation in said optical storage apparatus, wherein during said step of correcting said laser beam power said laser beam power corrector corrects said laser beam power at said first power level using said analog form controlling method with a data sampling operation, said laser beam power at said second power level using a digital form controlling method with said data sampling operation, and said laser beam power at said third power level using a predetermined calculation on the basis of said second power level during a time of said data writing mode when one of said one-time-recordable type compact disk is in operation in said optical storage apparatus, and wherein during said step of correcting said laser beam power said laser beam power corrector corrects said laser beam power at said first power level using a digital form controlling method, said laser beam power at said second power level using a digital form controlling method with said data sampling operation, and said laser beam power at said third power level using a predetermined calculation on the basis of said second power level during a time of said data writing mode when said many-time-erasable-rewritable type compact disk is in operation in said optical storage apparatus.

27. The method according to claim 25, wherein during said step of correcting said laser beam power said laser beam power at said third power level is determined using a predetermined calculation on the basis of the ratio of said third power level to said second power level.

28. The method according to claim 25, wherein during said stop of correcting said laser beam power said laser beam power corrector previously corrects said laser beam power at said second power level using a digital form controlling method with said data sampling operation based on a dummy laser beam generated by said laser beam generator before said optical storage apparatus starts to control said compact disk in operation by a servo control.

29. The method according to claim 25, wherein during said step of correcting said laser beam power said laser beam power corrector previously corrects said laser beam power at said first power level to be used during said time of said data writing mode using said laser beam power at said first power level that has been used during said time of said data reading mode, for said time of said data writing mode when said many-time-erasable-rewritable type compact disk is in operation in said optical storage apparatus.

30. The method according to claim 29, wherein during said step of correcting said laser beam power said laser beam power corrector previously corrects said laser beam power at said first power level to be used during said time of said data writing mode to an equal value of said laser beam power at said first power level that has been used during said time of said data reading mode.

31. A compact disk driving apparatus, comprising:

a central processing unit for controlling an entire operation of said compact disk driving apparatus;

an encoder and decoder unit for interfacing with an external apparatus connected to said compact disk driving apparatus;

a servo-motor controller for controlling a servo-controlled-motor for rotating a compact disk that is in an operational position in said compact disk driving apparatus; and a laser beam controller for controlling a laser beam;

wherein said laser beam controller includes:

a laser beam generator for generating a laser beam;

a laser beam power varier for varying said laser beam power to a plurality of power levels including at least first, second, and third power levels;

a memory for storing a plurality of predetermined reference values including a plurality of first reference values corresponding to said laser beam power at said first power level and a plurality of second reference values corresponding to said laser beam power at said second power level;

a light amount detector for detecting a light amount of said laser beam generated by said laser beam generator;

a laser beam power corrector for correcting said laser beam power at the respective power level by comparing said light amount detected by said light amount detector and a corresponding one of said plurality of said predetermined reference values selected by a type of said compact disk in operation in said optical storage apparatus;

a power level assigner for assigning said first power level to be used as a data reading power during a time of said data reading mode when one of said read-only-memory, said one-time-recordable, and said many-time-erasable-recordable types of said compact disk is in operation in said optical storage apparatus, for assigning said first power level to be used an a base power, said third power level to be used as an initial power, and said second power level to be used as a data writing power during a time of said data writing mode when said one-time-recordable type of said compact disk is in operation in said optical storage apparatus, for assigning said first power level to be used an a bottom peak power in a data writing pulse, said second power level to be used as a base power, and said third power level to be used as a top peak power in said data writing pulse during a time of said data writing mode when said many-time-erasable-rewritable type of said compact disk is in operation in said optical storage apparatus, and for assigning said second power level to be used as an erasing power during a time of said data erasing mode when said many-time-erasable-rewritable type of said compact disk is in operation in said optical storage apparatus.

32. A laser beam controller for controlling a laser beam generated by a laser in an optical disk drive, the optical disk drive being capable of accessing multiple types of optical disk media, the laser beam controller comprising:

a laser driver connected to the laser for varying the laser beam power according to a set of control signals for read, write and erase operations;

a photodetector connected to a laser driver controller for measuring the laser beam power;

a memory connected to a laser driver controller for storing a plurality of reference power level sets, each of the reference power level sets comprising laser beam power levels for read, write and erase operations applicable to one of the multiple types of optical disk media; and a laser driver controller connected to the laser driver for generating a set of control signals output to the laser driver, the control signals being based on the power of the laser beam as measured by the photodetector and a reference power level set corresponding to the type of optical media being accessed.

33. A method for controlling a laser beam in an optical disk drive capable of accessing multiple types of optical disk media, the method comprising the steps of:

generating a laser beam;

varying the laser beam power according to a set of control signals for read, write and erase operations;

measuring the laser beam power;

storing a plurality of reference power level sets, each of the reference power level sets comprising laser beam power levels for read, write and erase operations applicable to one of the multiple types of optical disk media; and generating a set of control signals output to the laser driver, the control signals being based on the measured power of the laser beam and a reference power level set corresponding to the type of optical media being accessed.

34. An optical disk drive capable of accessing multiple types of optical disks, the optical disk drive comprising:

an encoder/decoder for interfacing with an external apparatus connected to said optical disk drive;

a servo-motor for rotating an optical disk;

a servo-motor controller connected to the servo-motor for controlling the servo-motor;

a laser for generating a laser beam;

a laser beam controller including:
    a laser driver connected to the laser for varying the laser beam power according to a set of control signals for read, write and erase operations;
    a photodetector connected to a laser driver controller circuit for measuring the laser beam power;
    a memory connected to a central processing unit for storing a plurality of reference power level sets, each of the reference power level sets comprising laser beam power levels for read, write and erase operations applicable to one of the multiple types of optical disk media; and
    a laser driver controller circuit connected to the laser driver for generating a set of control signals output to the laser driver, the control signals being based on the power of the laser beam as measured by the photodetector and an analog reference power level signal set corresponding to the type of optical media being accessed;

a digital-to-analog converter connected to the laser driver controller circuit for supplying the analog reference power level signal set based on a reference power level set; and a central processing unit connected to the servo-motor controller, the encoder/decoder, and the digital-to-analog converter for supplying a reference power level set to the laser driver controller circuit.

* * * * *